United States Patent [19]
Mori

[11] Patent Number: 6,089,765
[45] Date of Patent: Jul. 18, 2000

[54] PRINT SYSTEM AND PRINTER

[75] Inventor: Hiromi Mori, Nagoya, Japan

[73] Assignee: Brother Kogyo Kabushiki Kaisha, Nagoya, Japan

[21] Appl. No.: 09/163,353

[22] Filed: Sep. 30, 1998

[30] Foreign Application Priority Data

Oct. 3, 1997 [JP] Japan ................................. 9-271378

[51] Int. Cl.⁷ ................................................ B41J 11/44
[52] U.S. Cl. ................................. 400/61; 400/70; 400/76
[58] Field of Search ................................ 400/61, 70, 76

[56] References Cited

U.S. PATENT DOCUMENTS

| | | | |
|---|---|---|---|
| 4,825,405 | 4/1989 | Makino et al. | 364/900 |
| 4,970,554 | 11/1990 | Rourke | 355/202 |
| 5,047,955 | 9/1991 | Shope et al. | 364/519 |
| 5,179,637 | 1/1993 | Nardozzi | 395/114 |
| 5,483,623 | 1/1996 | Nagashima | 395/115 |
| 5,764,863 | 6/1998 | Fall et al. | 395/112 |

FOREIGN PATENT DOCUMENTS 59-71590  4/1984  Japan .................... 364/900

*Primary Examiner*—John S. Hilten
*Assistant Examiner*—Charles H. Nolan, Jr.
*Attorney, Agent, or Firm*—Oliff & Berridge, PLC

[57] ABSTRACT

A printing system in which print data created by an application program and transferred to a printer is stored and managed in a print data storage device, providing that the print data is authorized for reprinting. A printer monitor is provided to constantly monitor the printer for a request to retransmit data that has already been printed. When such a retransmission request from the printer is detected, the print data requested for retransmission is specified in the print data storage device and is transmitted to the printer for reprinting.

17 Claims, 10 Drawing Sheets

PRINT SYSTEM AND PRINTER

BACKGROUND OF THE INVENTION

1. Field of the Invention

The present invention relates to a printing system and printer including a function for reprinting data that has been printed earlier.

2. Description of Related Art

In recent years, the progress of network-related technology in the computer industry has led to the construction of network systems in which a plurality of computers are connected to one printer via a local area network (LAN) containing a client server. Such a system is advantageous in terms of low equipment expenses and efficient use of space, because all the computers use one common printer via the client server for printing.

However, when one printer is used to serve a plurality of computers, as described above, some computers used in the system must be placed a great distance from the printer. When the users of these remotely located computers print a document, they must subsequently proceed to the printer in order to retrieve their printed document.

Hence, if the user prints a document, proceeds to the printer to retrieve the document, and after verifying the printed material decides to print the same document again, then this user must suffer the inconvenience of again returning to the computer and inputting a command to reprint the document.

In order to solve this problem, U.S. Pat. No. 4,825,405 has proposed a printer of a type that can facilitate a reprint from the printer itself. This type of printer includes an internal memory capable of storing one-page of print data, for example. Accordingly, the user can operate keys provided on the printer panel and reprint only the page that has been printed last, without leaving the printer.

SUMMARY OF THE INVENTION

However, with the printer described above, the only data that can be reprinted is one-page of data for the last page that has been printed. It is not possible to print any other pages or to print other types of printing data printed before the last page.

As a means to solve this problem, it is conceivable to equip the printer with a memory capable of storing a plurality of pages of data, rather than just one page of data, or a plurality of types of print data. However, this means is not desirable because equipping the printer with such a memory device would increase the cost of the printer.

In view of the foregoing, it is an object of the present invention to provide a printing system and printer that enables a user to execute a process to reprint a plurality of types of print data via a command from the printer itself, without requiring a large amount of capacity to the printer memory.

In order to attain the above and other objects, the present invention provides a print system for performing a printing operation, the print system comprising: a printer including: reception means for receiving print data; print performing means for performing print process with using the print data; and print data retransmission request means for requesting retransmission of the print data desired to be reprinted after the print performing means has printed the print data; and a computer including: transmission means for transmitting the print data to the printer so that the printer will print the print data; and monitoring means for continuously monitoring the retransmission request from the printer; and retransmission execution means for retransmitting the print data to the printer in response to the retransmission request.

According to another aspect, the present invention provides a printer for performing printing process based on print data transmitted from a computer, the printer comprising: receiving means for receiving print data from a computer; print process means for printing the print data; and retransmission request means for requesting the computer to retransmit print data after the print data has been printed.

DETAILED DESCRIPTION OF THE PREFERRED EMBODIMENTS

A printing system and printer according to preferred embodiments of the present invention will be described while referring to the accompanying drawings.

[First Embodiment]

Figure 1:
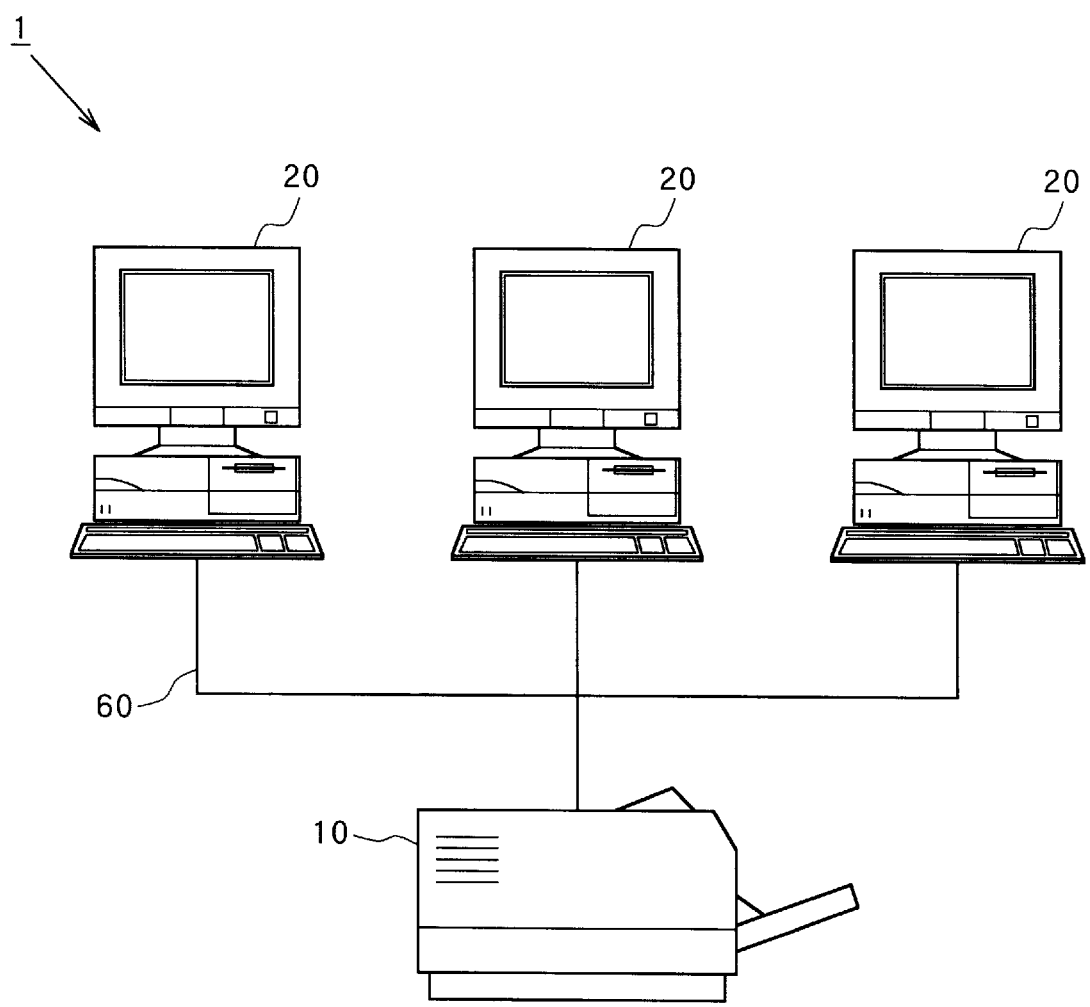
FIG. 1 is an explanatory diagram showing a printing system according to a first embodiment of the present invention.

A printing system according to a first embodiment of the present invention is constructed from a network system 1 shown in FIG. 1.

The network system 1 is constructed from: a plurality of client computers 20, including personal computers, workstations, and the like. The computers 20 are remotely connected by a local area network (hereinafter referred to as a LAN) 60 and share one printer 10 via a client server (not shown), which is a computer dedicated to serving the client computers 20.

With this arrangement, a user at each computer 20 can perform a printing process by transmitting print data created in his/her computer 20 to the printer 10. After a printing process has been performed, the user retrieves the printed document from the printer 10. The user then verifies the printing. If the user desires to reprint the document, that user can execute a reprint command for the desired print data at the printer 10 itself.

Figure 2:
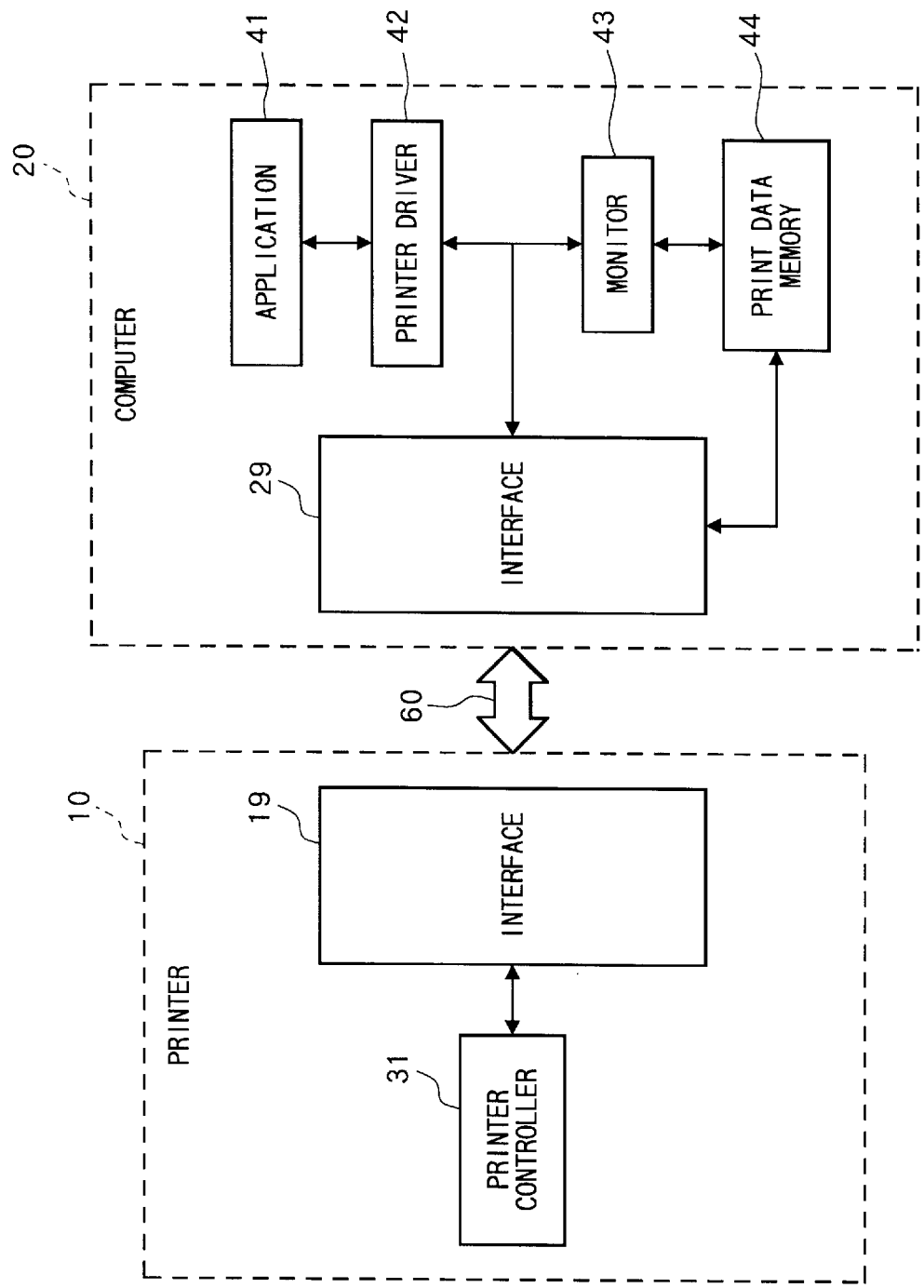
FIG. 2 is a conceptual diagram showing the printing system of the first embodiment.

Each of the plurality of computers 20 is connected to the printer 10 via a LAN 60 as shown in FIG. 2. Although not shown in the drawings, the LAN 60 includes the client server.

As shown in FIG. 2, the computer 20 is provided with: several application programs 41 for creating print data; a printer driver 42 for converting the print data to a format supported by the printer 10 and for transmitting the converted data to the printer 10; a printer monitor 43 for monitoring signals issued from the printer 10; a print data storage device 44 for temporarily storing print data to be transmitted to the printer 10; and an interface 29 which enables communication with the printer 10.

The printer 10 includes: a printer control portion 31 for performing various control operations in response to commands received from the computer 20; and an interface 19 which enables communication with each computer 20.

Figure 3:
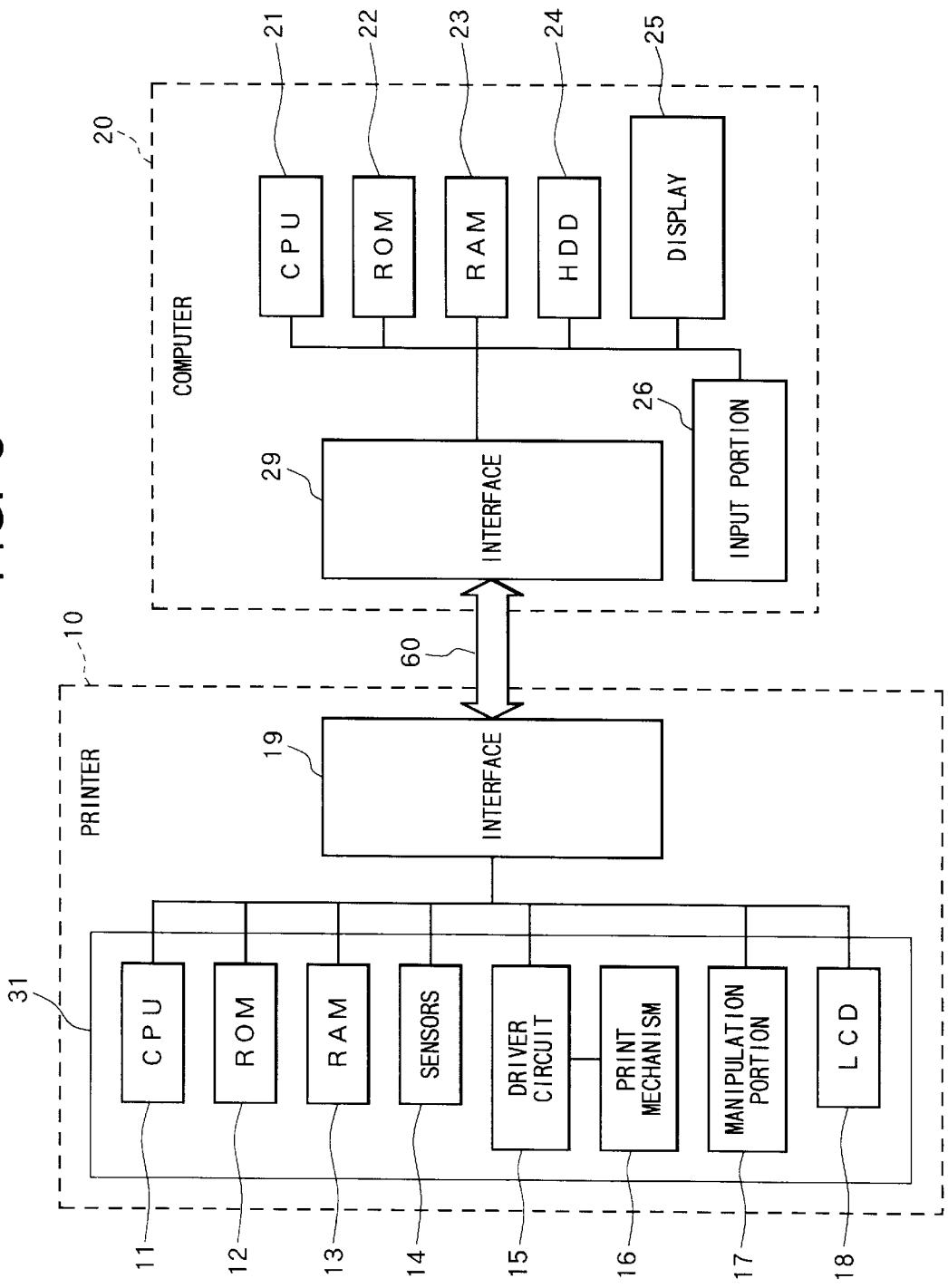
FIG. 3 is an explanatory diagram showing a hardware configuration of the printing system.

As shown in FIG. 3, the printer control portion 31 of the printer 10 is constructed from: a CPU 11 for controlling the entire printer 10; a ROM 12 used to store various control programs such as a main control program and print programs (printer controller 31) shown in FIGS. 7 and 8; a RAM 13 including various buffers for temporarily storing print data transmitted from the computer 20 and storing a printer job management table T2 (which will be described later); a control unit 17 for enabling the user to input commands such as a reprint command; a liquid crystal display 18 (hereinafter referred to as a LCD 18) for displaying a list of reprintable print data in the printer job management table T2; a print mechanism 16 for printing on a recording medium according to the transmitted print data; a driver circuit 15 for communicating with the print mechanism 16; and various sensors 14.

It is noted that the printer 10 is of a type that can store, in the RAM 13, the last page of print data (job) printed last onto a predetermined type of sheet. The printer 10 may store the last page of the last performed job in a hard disk drive, not shown, connected to the printer 10. Details of the structure of the printer 10 are described in the U.S. Pat. No. 4,825,405, the disclosure of which is hereby incorporated by reference. Alternatively, the printer 10 can be configured to store print data for a plurality of pages in the RAM 13 or the hard disk (not shown). In this case, the printer 10 can maintain print data not only for the last page of the latest-performed job but also for pages of jobs printed prior to the latest-performed job if the total number of pages of those jobs does not exceed a maximum page number predetermined for the printer 10.

Figure 4:
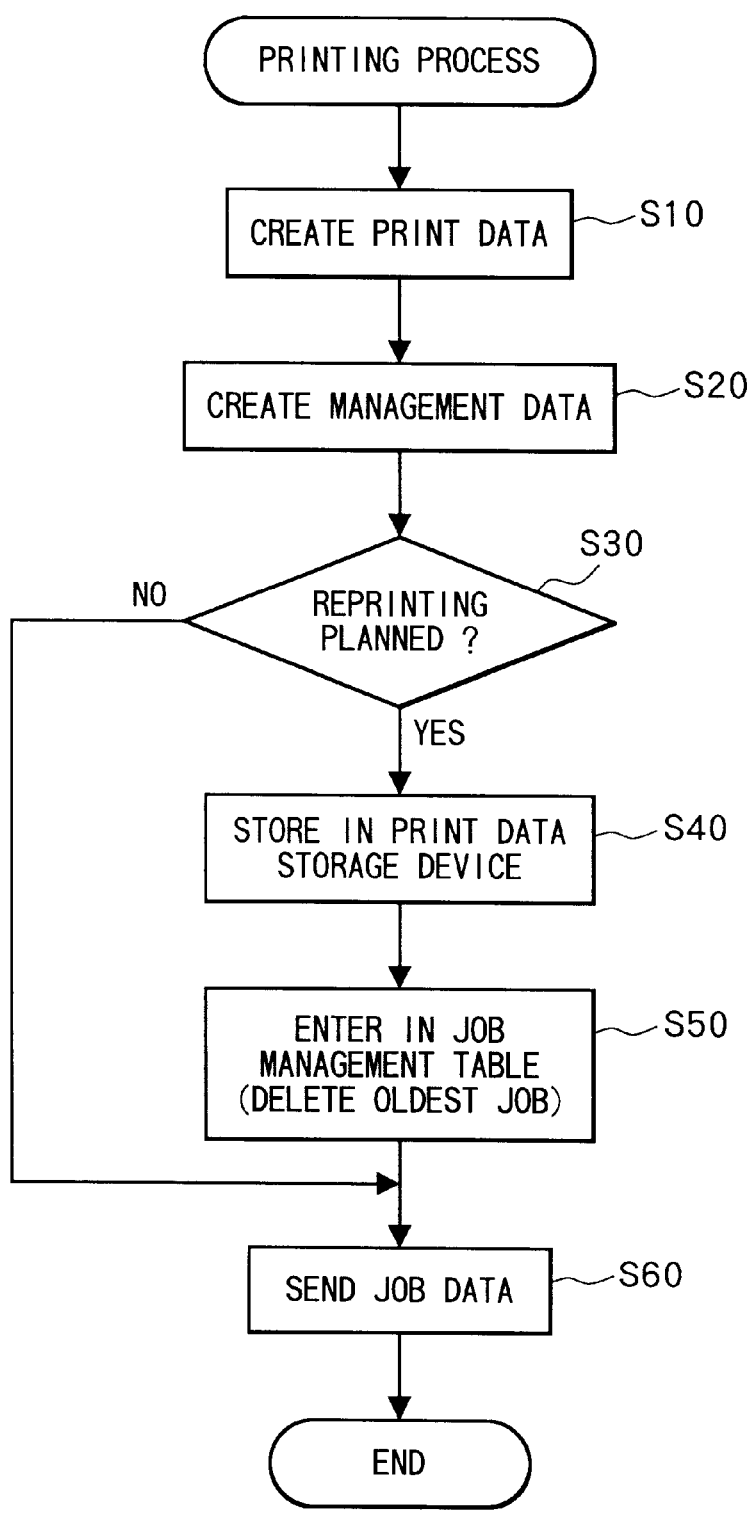
FIG. 4 is a flowchart explaining a printing process on the computer end.
Figure 5:
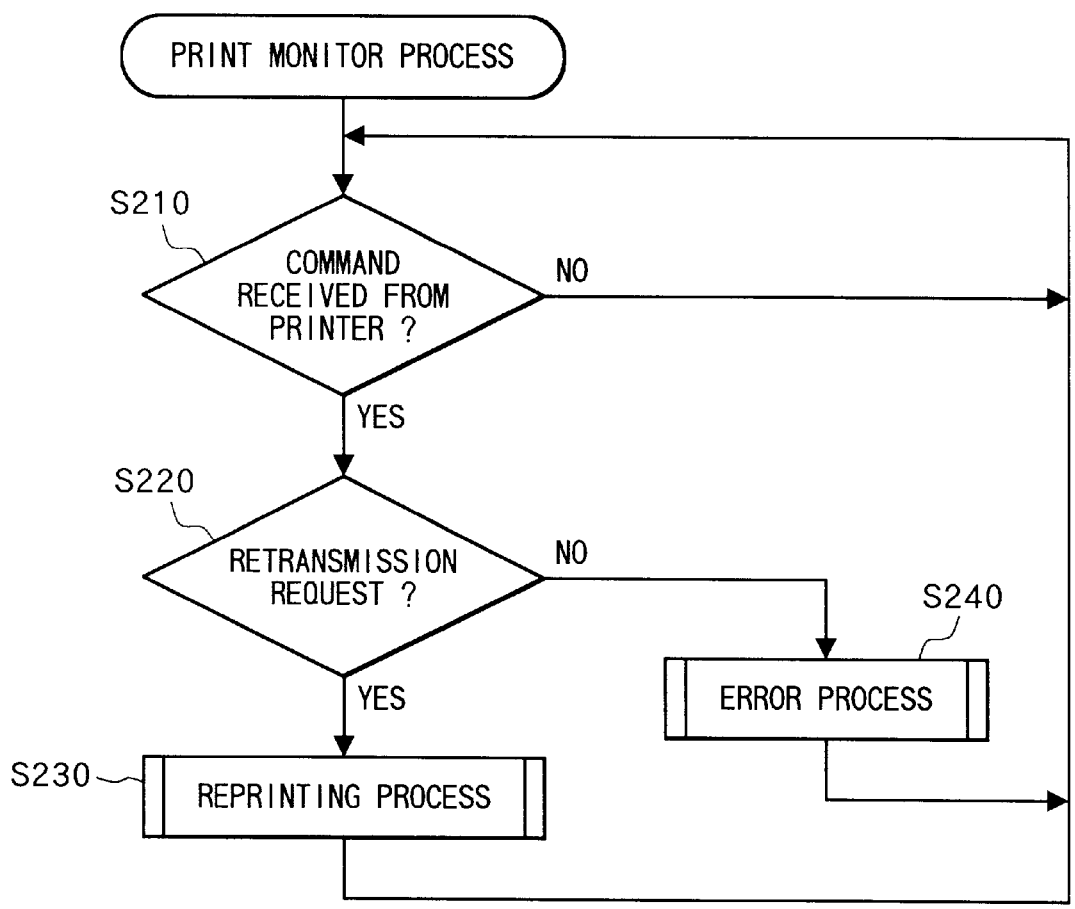
FIG. 5 is a flowchart explaining a process of a print monitor in the computer.
Figure 6:
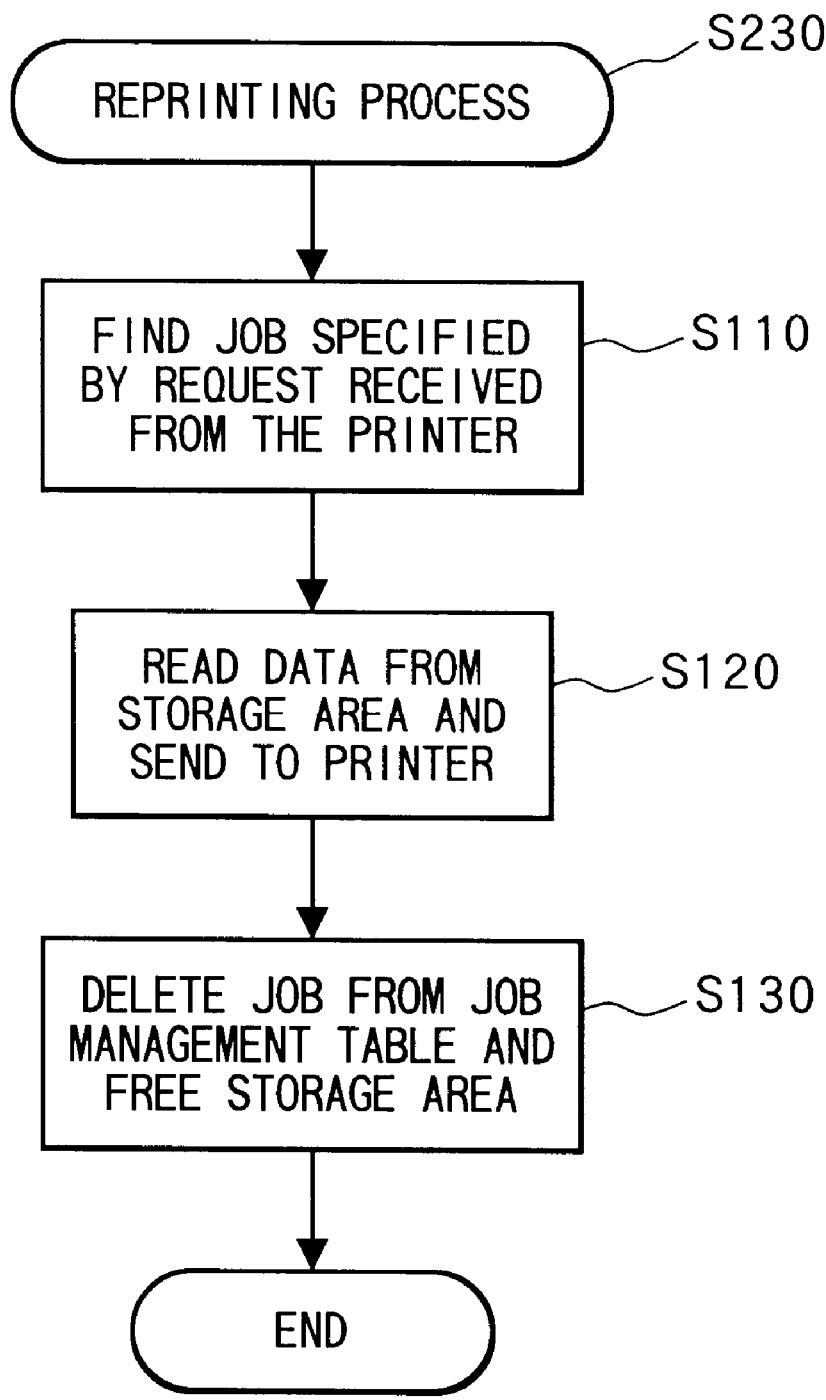
FIG. 6 is a flowchart explaining a reprinting process on the computer end.

The computer 20 includes: a CPU 21 for controlling the entire computer 20 to execute the application program 41, the printer driver 42, and to serve as the monitor 43; a ROM 22 storing control programs and the like used to control basic hardware; a hard disk drive 24 storing the application programs 41 and print data processing programs of FIGS. 4–6 (printer driver 42 and monitor 43) and serving as the print data storage device 44; a RAM 23 serving as a temporal data memory area for storing various data obtained during various processings and appropriate programs read from the hard disk drive 24 when to be executed and also storing a computer job management table T1 (to be described later); an input unit 26 including a keyboard, mouse, and the like for enabling a user to input various commands such as a print command and other various commands; and a display 25.

Although not shown in the drawing, the client server exists in the network 60 connected between the computer 20 and the printer 10. The client server does not execute an application program or the like for creating print data, but rather serves to temporarily store print data transmitted from the computers 20 on the network 60. In other words, the client server functions as a print server by creating a print queue (waiting data train) and managing transmission of print data to the printer 10. The client server always intervenes in the transfer of data between the computer 20 and the printer 10.

The print data storage device 44 is for storing and managing print data that is created by the application program 41 and transferred to the printer 10 and that will possibly be desired to be reprinted by the printer 10. The printer monitor 43 is for constantly monitoring the printer 10 to determine whether the printer 10 has requested the computer 20 to resend print data to the printer 10 for reprinting. When the printer monitor 43 receives a retransmission request from the computer 20, the requested print data is selected from the print data stored in the print data storage device 44 and is resent to the printer 10 for reprinting.

The printer driver 42 performs job management, well-known in the art, onto print data for the purpose of managing information on the print data such as printing description contents and the number of pages. More specifically, the printer driver 42 adds header and footer sections to the front and back of each print data and manages each print data as one job. The header section includes data indicating the file name and number of pages for the relevant print data, as well as the name of the application (application name) used to create the print data. The footer section includes data indicating the end of the relevant print data.

It is noted that the print data storage device 44 is capable of storing as many as "n" number of sets of print data, where "n" is an integer number dependent on the capacity of the device 44.

In order to manage print data as separate jobs, the computer 20 stores the computer job management table T1, and the printer 10 stores the printer job management table T2.

First, the computer job management table T1 will be described. The computer job management table T1 shown below is stored in the RAM 23 of the computer 20, and is managed by the printer monitor 43.

<COMPUTER JOB MANAGEMENT TABLE T1>

| JOB ID | JOB NAME | FILE NAME | APPLICATION NAME | STORAGE ADDRESS | DELETE TIME |
|--------|----------|-----------|------------------|-----------------|-------------|
| 1 | job 1 | sample 1 | | | |
| 2 | job 2 | sample 2 | | | |
| : | : | : | : | : | : |
| : | : | : | : | : | : |
| : | : | : | : | : | : |
| n | job n | sample n | | | |

The computer job management table T1 assigns an ID number to each of "n" sets of print data, and manages the print data as Job IDs (1)–(n). The table T1 contains a job name, file name, application name, storage address, delete time, and the like for the print data recorded under each Job ID.

It is noted that "delete time" refers to a preset time that can be set for each of the print data stored in the print data storage device 44, indicating when to delete that data. The delete time specifies the time at which a prescribed amount of time is allowed to elapse after the print data has been entered in the job management table T1. When the user presets this amount of elapsed time, the delete time is automatically calculated and entered in the table T1. Each of the print data entered in the table T1 is automatically deleted at the corresponding delete time.

As described above, the print data storage device 44 is capable of storing as many as "n" sets of print data. Hence, in order to store the (n+1)th print data in the storage device 44, the oldest print data is deleted from the storage device 44. For this reason, on the job management table T1, the Job (entry data) corresponding to the (n+1)th print data, that is the print data with Job ID (n+1), is written over the job (entry data) corresponding to the print data for Job ID (1). The job corresponding to print data Job ID (n+2) is written over the job corresponding to print data for Job ID (2). Hence, the computer job management table T1 is used cyclically.

An alternative possible method of the cyclic use is to always enter the oldest Job in Job ID (1) and the newest job in Job ID (n) by shifting the data in the Job IDs (1)–(n) each time new print data is entered. In this way, the computer job management table T1 is configured to manage only the fixed number "n" of jobs.

The printer job management table T2 shown below is stored in the RAM 13 of the printer 10.

<PRINTER JOB MANAGEMENT TABLE T2>

| JOB ID | JOB NAME | PAGE NUMBER | DATA ON COMPUTER |
|--------|----------|-------------|------------------|
| 1 | job 1 | 1 | |
| 2 | job 2 | 2 | |
| : | : | : | : |
| : | : | : | : |
| : | : | : | : |
| n | job n | 2 | |

As apparent from the above, the printer job management table T2 has the similar structure to the computer job management table T1. Data with job IDs is written sequentially in the printer job management table T2 in correspondence with entries in the computer job management table T1 stored in the computer 20. The printer job management table T2 stores the job name for print data entered next to each of the Job IDs, the number of pages, PC data for specifying an originating computer 20 on the network, and the like.

The printer 10 is configured to be capable of displaying data of the printer job management table T2 on the LCD 18, enabling the user to easily search all the sets of reprintable print data and to select one set of print data desired for reprinting. When the user selects the job name of a job for reprinting, the printer 10 sends, to the computer 20, a command that includes the selected job name and that requests the computer 20 to retransmit to the printer 10 print data corresponding to the selected job name. The printer monitor 43 in the computer 20 detects the command (request for retransmission) and executes a process to transmit the requested print data to the printer 10.

It is noted that the printer 10 can manage the number of pages for each print data on the printer job management table T2. This is effective because the printer 10 is of the type that can retain one or more predetermined pages of print data for reprinting operation. It is now assumed that the printer 10 is of the type that can store only the last page of the latest-printed data. When the user requests a reprint of the latest-printed data, if the printer 10 confirms, based on the management table T2, that the requested print data contains a single page's worth of data, the printer 10 can know that the requested print data is retained in the printer 10. Accordingly, the printer 10 executes a direct reprint of this print data without sending a retransmission request to the computer 20. As a result, work becomes more efficient.

As described already, the computer 20 and printer 10 are controlled to record, in their tables T1 and T2, the corresponding series of print data. When a job is deleted on the computer 20 end, the same job is deleted on the printer 10 end. When a job is added on the computer 20 end, the same job is added on the printer 10 end.

Next, data processing performed in the print system 1 of the present embodiment will be described in detail with reference to the flowcharts of FIGS. 4–8.

First, the process executed by the computer 20 to perform a printing operation will be described with reference to FIGS. 4–6.

The printing process of FIG. 4 is started when the user executes or inputs a print process execute command via the input portion 26 to print image data created using one application program 41. When the printing process is started, the CPU 21 first creates print data in S10 in a prescribed area of the RAM 13. Then, in S20, the CPU 21 creates header data and footer data. The header data includes data for managing the print data. More specifically, the header data includes data of application name that has created the print data, file name for the print data, the number of pages to be printed for the print data, identification name for specifying the computer 20 on the network 60 that has created the print data, and the like. The footer data indicates the end of the print data. The CPU 21 then adds the header data and the footer data to the print data.

Next, in S30, the CPU 21 determines whether or not the subject print data is intended to be reprinted. This process of S30 allows the user to prohibit reprinting of sensitive or secret information, which should not be left in a form that would allow anyone to reprint the information. In this step, therefore, the user can manipulate the input portion 26 either to indicate that the data is prohibited from being reprinted or to specify that the data is intended for reprinting.

If the CPU 21 determines based on the user's indication that the print data might be reprinted ("yes" in S30), the CPU 21 stores the print data in the print data storage device 44 in S40. Then, in S50, the CPU 21 assigns a new Job ID to the print data, and enters the information on the print data together with the new Job ID in the computer job management table T1. The CPU 21 also adds the Job ID to the header data of the print data. Subsequently, in S60, the CPU 21 transmits the print data together with the Job ID to the printer 10 so that the printer 10 will perform a normal printing operation with the print data while knowing that the print data might be reprinted.

On the other hand, if the CPU 21 determines that the print data is not intended for reprinting ("no" in S30), then the CPU 21 omits the process of S40 for storing the print data in the print data storage device 44 and the process of S50 for making an entry in the computer job management table T1. The program directly proceeds to S60 where the CPU 21 transmits the print data to the printer 10 so that the printer 10 will perform a normal printing operation with the print data. In this case, any Job ID is not added to the header data of the print data. Accordingly, when receiving the print data, the printer 10 recognizes that any Job ID is not provided in the print data and can therefore determine that this job will not be reprinted.

It is noted that if the computer job management table T1 becomes full, print data for the newest job is written to the print data storage device 44 in S40, and entry data corresponding to this newest job is written in S50 over entry data corresponding to the oldest job, thereby freeing up storage area in the print data storage device 44 previously occupied by the print data corresponding to the oldest job. Thus, the print data for the oldest job is deleted from the print data storage device 44. In this case, a portion or all of the print data corresponding to the newest job can be written over the memory area in which print data corresponding to the oldest job is stored. The computer 20 informs the printer 10 of the deletion of the oldest job through transmitting a job delete command to the printer 10 so that the printer 10 will delete the corresponding entry data from the printer job management table T2 in order to renew the table T2 in correspondence with the table T1.

It is noted that before deleting the oldest job, the computer 20 may first inform the printer 10 of the deletion through transmitting the job delete command to the printer 10 so that the printer 10 will delete the entry data for the oldest job from the printer job management table T2. After completing the deleting operation, the printer 10 will transmit a delete confirmation signal to the computer 20. The computer 20 will delete the oldest job after receiving this confirmation from the printer 10.

Next, the process of the print monitor 43 provided in the computer 20 will be described with reference to FIG. 5.

As shown in FIG. 5, the printer monitor 43 constantly monitors in S210 the printer 10 to determine whether or not signals, such as requests to retransmit print data for reprinting, warning signals, or the like, have been sent from the printer 10. If some signals have been received from the printer 10 ("yes" in S210), the signals are analyzed in S220 to determine whether or not those signals are a request for retransmission of data for reprinting. If the signals are a retransmission request ("yes" in S220), a reprinting process of FIG. 6 is executed in S230. On the other hand, if the signals are not a retransmission request but are a warning signal or the like ("no" in S220), another normal process, such as an error process, is executed in S240 in response to the warning signal or the like.

Next, the reprinting process of S230 will be described with reference to FIG. 6. This reprinting process of S230 is executed by the computer 20 when the printer monitor 43 receives a retransmission request.

Upon receiving a retransmission request from the printer 10 (yes in S220), the CPU 21 first identifies in S110 a job specified in the request transmitted from the printer 10. It is noted that the retransmission request includes: a command body for specifying a reprint instruction; and identification data (for example, Job ID) for specifying the job desired to be reprinted. Next, in S120, the CPU 21 retrieves the specified print data from the print data storage device 44. The CPU 21 transmits the print data to the printer 10 without adding any Job ID to the print data. Subsequently, in S130, the CPU 21 deletes, from the computer job management table T1, job data (entry data) corresponding to the print data that has just been retransmitted for reprinting, and clears the corresponding storage area in the print data storage device 44.

It is noted that in the above description, the job (entry data) corresponding to the print data that has just been reprinted is immediately deleted from the computer job management table T1, and the storage area in the print data storage device 44 is cleared in order to allow new jobs to be recorded. However, this data need not be deleted immediately after a reprint is completed. That is, the process of S130 may be omitted. In this case, job data and their corresponding print data may be automatically deleted only after a specified delete time has elapsed, for example.

Alternatively, if the capacity of the print data storage device 44 is restricted, it may be possible to delete jobs and their corresponding print data in an order beginning from the oldest job when the capacity of the print data storage device 44 is exceeded. For example, this deletion operation can be executed in S50 when the print data storage device 44 becomes full with the newest-created print data. It is also possible to delete jobs and their corresponding print data in the order beginning from the oldest job only when the computer job management table T1 becomes full. It is noted that when the computer 20 deletes jobs and corresponding print data according to each of the above-described modifications, the computer 20 transmits a job delete command to the printer 10 so that the printer 10 will delete the same job from the printer job management table T2.

Next, the printing process executed in the printer 10 of the print system 1 will be described with reference to FIGS. 7 and 8.

Figure 7:
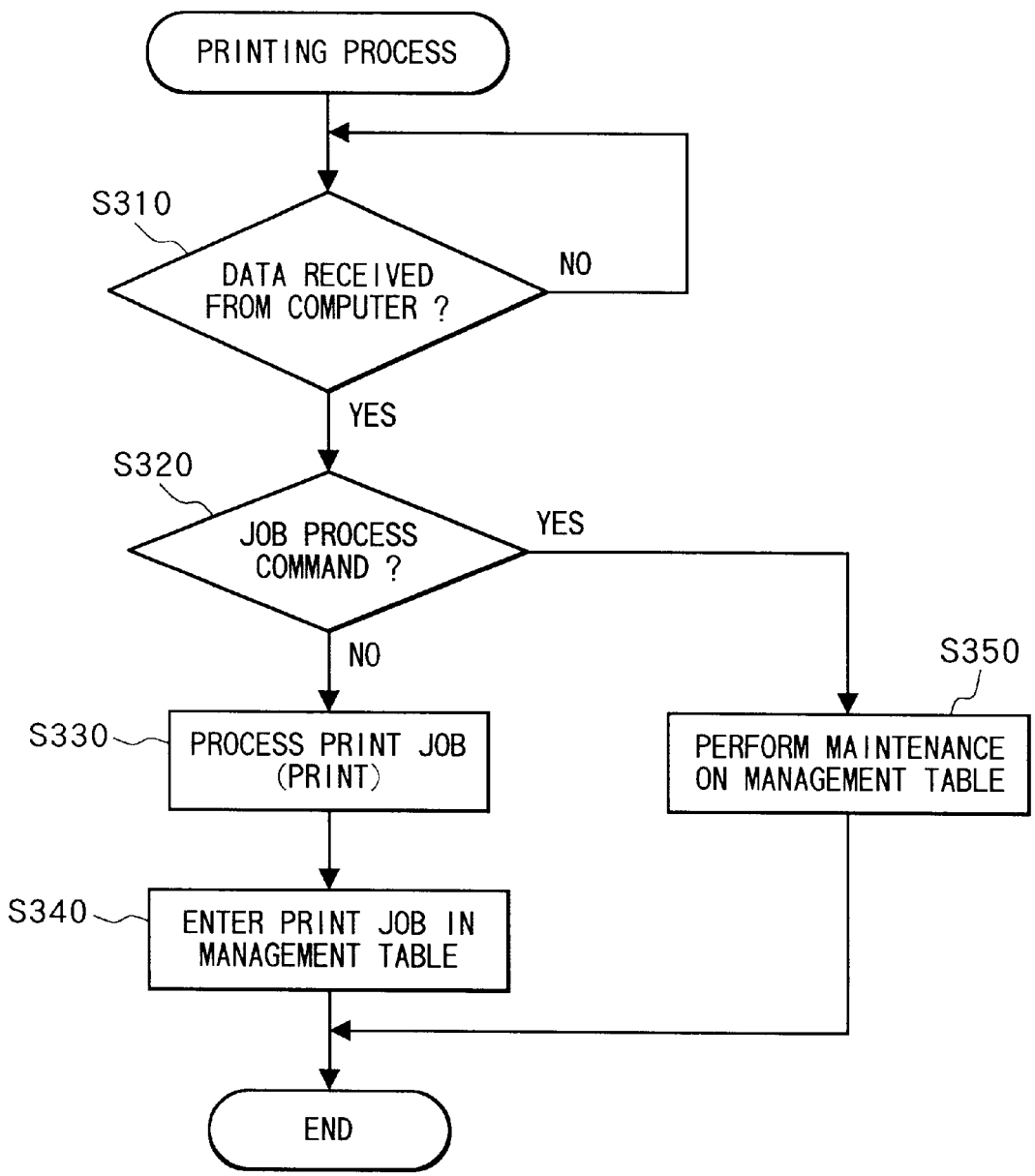
FIG. 7 is a flowchart explaining a printing process on the printer end.
Figure 8:
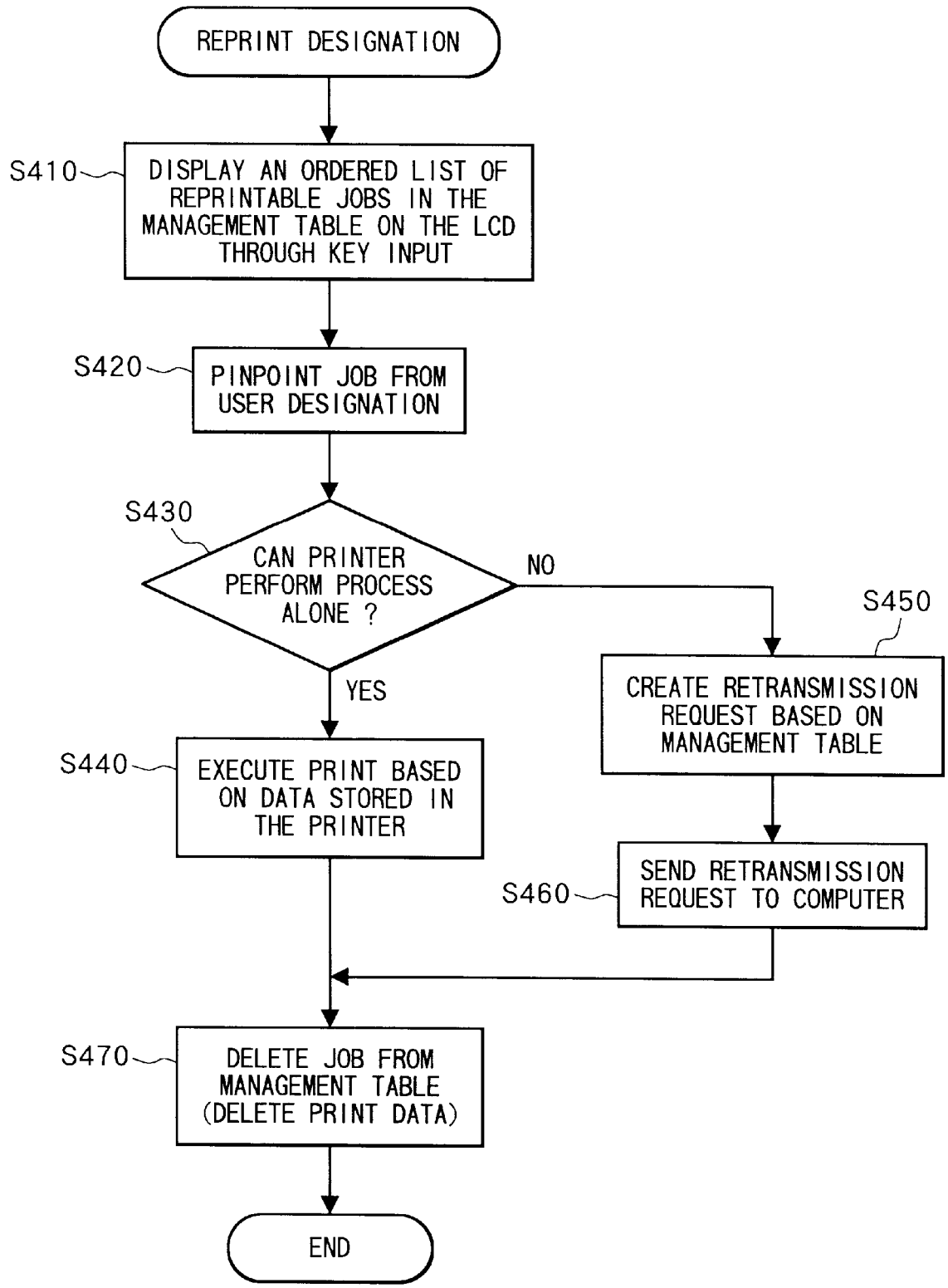
FIG. 8 is a flowchart explaining a reprinting designation process on the printer end.

The CPU 11 constantly performs the printing process of FIG. 7. When the CPU 11 determines in S310 that some data has been received from the computer 20 ("yes" in S310), the CPU 11 analyzes the received data in S320 to determine whether or not the data is a job process command such as a job delete command or the like.

If the data is determined to be a job process command ("yes" in S320), the CPU 11 performs in S350 a maintenance operation onto the printer job maintenance table T2 according to the contents of the command, such as writing to or deleting from the management table T2.

For example, the job process command is the job delete command, that is, a request to delete a job. As described above, this job delete command is issued from the computer 20 when the computer 20 deletes a corresponding job at the timing, for example, when the delete time included in the job data for the corresponding Job ID has arrived. Accordingly, when receiving a job delete command, the printer 10 deletes in S350 the specified job from the printer job management table T2, and transmits delete confirmation signals to the computer 20 informing the computer 20 to that effect.

On the other hand, if the received data is determined not to be a job process command but to be print data ("no" in S320), the CPU 11 first separates in S330 the print data into: management data such as header data and the like; and print data body for performing actual printing. The CPU 11 then performs a normal printing control operation with controlling the driver circuit 15 with the print data body.

Then, in S340, the CPU 11 performs an entering process to or not to enter, in the print job management table T2, the print data just printed. The CPU 11 performs this entering operation based on the management data, such as the header data and the like, for the subject print data. More specifically, the CPU 11 judges whether or not a Job ID is included in the header data. If a Job ID is included in the header data, the CPU 11 determines that the print data is intended for reprinting, and therefore enters this job in the printer job management table T2. On the other hand, if any Job ID is not included in the header data, the CPU 11 does not enter this job in the printer job management table T2. Accordingly, when the received print data is not intended for reprinting, the header data is not included with any Job ID, and therefore the print data is not entered in the table T2. Similarly, when the received print data is retransmitted data for reprinting, any Job ID is not included in the header data, either, and therefore the retransmitted print data is not reentered into the table T2.

Next, a reprinting designation process performed by the printer 10 will be described with reference to FIG. 8.

In order to start executing the reprinting designation process, the user first manipulates the control unit 17 of the printer 10 so as to set the printer 10 into a mode for displaying the printer job management table T2 on the LCD 18 provided in the panel of the printer 10. Then, the reprinting designation process of FIG. 8 starts being executed.

In this process, the CPU 11 first controls in S410 the LCD 18 to display all the reprintable jobs in the printer job management table T2 in sequence in response to the user's manipulation of keys and the like provided in the control unit 17. It is noted that because the printer 10 is provided on the network 60, the printer 10 is possibly connected with many computers 20 and possibly receives transmissions of print data from those many computers 20. In order to handle print data from such a large number of computers 20, it is preferable that the jobs are sorted and displayed on the LCD 18 for each computer 20 based on data indicative of the originating computers 20 stored in the printer job management table T2. For example, the jobs can be displayed hierarchically for each computer 20, facilitating the user's selection of his/her desired job.

Viewing the thus displayed jobs, the user manipulates the control unit 17 to select one job desired to be reprinted. Accordingly, in S420, the CPU 11 specifies the user's selected job for print data to be reprinted according to the user's indication.

Then, in S430, the CPU 11 determines whether or not the selected print data can be reprinted by the printer 10 alone. That is, as described already, the printer 10 is of the type that can store the last page of last-printed data in the storage device, such as the RAM 13 or the hard disk (not shown), and can therefore reprint this last page by itself. Hence, the CPU 11 judges whether or not the print data requested for reprinting by the user is the last page of the last job printed. If the requested print data is the last page of the last job printed, then the CPU 11 determines that this job is reprintable by the printer alone (Yes in S430).

As also described already, the printer 10 can be configured to store print data for a plurality of pages in the storage device. In this case, all the pages of the designated print data may possibly be contained among the pages stored in the printer 10. The CPU 11 therefore judges in S430 whether or not all the pages for the designated job are retained in the printer storage device. In order to perform this judgment, the CPU 11 refers to the page number data in the printer job management table T2 and judges whether or not the entire pages of the user's designated job is maintained in the printer storage device. More specifically, the CPU 11 calculates the total number of pages the printer 10 has printed from the user's designated job until the latest-performed job and judges whether or not the calculated total page number is smaller than the maximum number of pages capable of being stored in the printer 10. When the calculated page number is smaller than the maximum page number, the CPU 11 determines that the user's designated job is stored in the printer 10. If the CPU 11 determines that print data for the designated job is retained in the storage device, the CPU 11 determines that the printer alone can perform the reprinting without sending a retransmission request to the computer 20 (yes in S430).

It is noted that information on the number of pages for each job is originally added by the computer 20 into the header data for the corresponding print data. The page number information is then entered into the printer job management table T2 at the printer side 10. However, the computer 20 may not originally add the page number data to the header information. In this case, the printer 10 may determine the number of pages for the user's designated job during the printing process of S330, and then enter the page number data into the printer job management table T2 in S340. This page number data is referred to in S430.

If the CPU 11 determines that reprinting is possible ("yes" in S430), the CPU 11 retrieves the user's designated print data from the storage device of the printer 10, and reprints the print data in S440. Then, in S470, the CPU 11 deletes the relevant print data from the storage device, and the process ends.

It is noted that the reprinted print data does not necessarily have to be deleted in S470 immediately following the reprinting process. It may be possible to delete the reprinted print data according to the user's settings. It may also be possible to delete the data when the storage device becomes full.

On the other hand, if the CPU 11 determines that the reprinting process cannot be performed by the printer 10 alone ("no" in S430), the CPU 11 creates in S450 a retransmission request while referring to the printer job management table T2. The CPU 11 creates the retransmission request so that the retransmission request includes the job name of the user's designated job. In S460, the CPU 11 sends the retransmission request to one computer 20 that is an original source of the user's designated print data. The CPU 11 determines the original source while referring to the computer indication data stored in the printer job management table T2. Thereafter, in S470, the CPU 11 deletes the job (entry data) corresponding to the user's designated print data from the printer job management table T2. Then, the process ends.

It is noted that in S470, the CPU 11 deletes, from the printer job management table T2, the Job (entry data), for which retransmission request has been transmitted to the computer 20 in S460. Thus, the CPU 11 deletes the retransmission-requested job immediately after performing this retransmission request. This delete process of S470 conforms to the delete process of S130, performed on the computer 20 side, to make the entries stored in the printer job management table T2 agree with those stored in the computer job management table T1. Therefore, if the process of S130 is omitted on the computer 20, then the process of S470 should also be emitted.

As described above, according to the printing system 1 of the present embodiment, print data created by the computer 20 with using the application program 41 for being transferred to the printer 10 is stored and managed in the print data storage device 44, providing that the print data is authorized for reprinting. In the computer 20, the printer monitor 43 constantly monitors the printer 10 for a request to retransmit data that has already been printed. When such a retransmission request from the printer 10 is detected, the print data requested for retransmission is specified in the print data storage device 44, and then sent to the printer 10 for reprinting.

In the above description, in S230, a Job ID is not assigned to print data retransmitted from the computer 20 in response to a retransmission request. However, the processes of S230 can be modified so that print data be resent with the same Job ID as that already stored in the printer job management table T2. In this case, the printer 10 can compare in S340 the Job ID of the retransmitted print data with the Job ID stored in the printer job management table T2 to determine whether the print data is intended for reprinting or has been reprinted. If the relevant print data is determined as has been reprinted, the job corresponding to this print data can be deleted when necessary from the printer job management table T2.

When designating in S420 the job for reprinting, rather than simply designating the job, it is also possible for the user to designate a print method for the reprinting process. Designation of the printing methods might include selecting the number of copies to be printed and which paper supply tray to use. Data designating such printing methods is added to the retransmission request command and sent to the computer 20. On the computer 20 end, when the retransmission request includes data designating the printing methods, the computer 20 adds the original print data with commands for executing those printing methods, and sends them to the printer 10 in S120. For example, when the user designates printing a plurality of copies, the computer 20 adds the print data with the command for printing the plurality of copies.

In the above description, the printing system 1 of the present embodiment is of a large-scale LAN type that includes the client server (not shown) which is capable of functioning as a print server. However, the printing system 1 of the present embodiment can be constructed in another LAN configuration of a relatively small-scale Peer to Peer type, in which a printer 10 connected to one computer 20 can be used also by other computers 20.

In the above description, although not shown in the drawings, the client server (print server) exists in the network 60 to intervene in the transfer of data between each computer 20 and the printer 10. However, the client server may be omitted, but one of the computers 20 in the printing system 1 may be configured as a print server not to execute the various application programs 41, but rather simply to temporarily store print data transmitted from other computers 20 on the network 60. In this modification, the one computer 20 stores, in the HDD 24, programs designed to perform the functions of a print server by creating a print queue and managing transmission of print data to the printer 10. Hence, even this type of computer 20 that achieves the functions of the print server will work effectively as the computer 20 in the printing system 1 of the above-described embodiment.

In the above description, the retransmission request is created in S450 to include data of the user's selected job name desired to be reprinted. However, the transmission request may not contain data of the job name. For example, the LCD 18 on the printer 10 is controlled to display only order numbers indicative of the time order (order of use), in which all the plurality of sets of print data, recorded in the job management table T2, have been printed by the printer 10. More specifically, the LCD 18 merely displays the plurality of order numbers from (−n) through (0), where the smallest order number (−n) indicates the oldest printed data (oldest job) and the greatest order number (0) indicates the latest printed data (last job). Viewing the LCD 18, the user can request a reprint of a job that is defined as have been printed a specific number of jobs earlier than the last job. It is now assumed that the last job printed is assigned with Job ID (n) and that the user operates the key input on the control panel 17 to request a reprint with specifying the order number of "REPRINT=−1". In this case, the CPU 11 may include only this order number information "−1" in the retransmission request and send it to the computer 20. When receiving the retransmission request, the printer monitor 43 on the computer 20 side traces backward one (1) in the management table T1, which is in the form of the circular list, to select print data corresponding to the job with Job ID(n−1) desired to be retransmitted to the printer 10. This method is particularly effective when the printer 10 is connected to the computer 20 that functions as a print server so that print data input to the printer 10 is uniformly managed at the single computer 20. It is also effective when the printer 10 is connected to a local port 1 (LPT1) of a single computer 20 and print data is inputted to the printer 10 only from the single computer 20.

Displaying only the print order numbers on the LCD 18 for the user's selection is advantageous considering the limited size of the LCD 18. However, information on this order number need not be used internally. Rather, the user's selected order number data can be used merely to select a job name or the like of the user's selected job from the printer job management table T2, and the retransmission request can still be made to include information on the selected job name or the like.

In the above description, new Job IDs are added only to those print data that are determined in S30 as possibly be requested to be reprinted. However, it may be possible to assign new Job IDs in sequence to all the newly-created print data in S20. Then, when the print data is determined not intended for reprinting in S30 ("no" in S30), the header data can be further added with identification data for indicating that the subject print data is prohibited from reprinting. Alternatively, when the print data is determined as intended for reprinting in S30 ("yes" in S30), the header data can be added with another identification data for indicating that the print data is intended for reprinting. The above-described indication data may be added to the print data before the print data is transmitted in S60. For example, the CPU 21 may add the indication data to the print data when making an entry in the management table T1 in S50. The printer 10 may discriminate the type of print data based on the identification data.

It may also be possible to prohibit non-specific users from reprinting a document by requiring the user in S30 to input his/her password or the like. In this case, for example, if the determination made in S30 is negative, the CPU 21 adds the header data with: data indicating that the print data is restricted from reprinting; and the user's inputted password data. The printer 10 will display that the subject print data is restricted from reprinting and can be reprinted only when the appropriate password is inputted.

In the above-described embodiment and modifications, reprinting is prohibited based on the user's inputted instruction. However, the computer 20 can automatically prohibit reprinting when the subject print data exceeds a prescribed number of pages. Storing a large number of print pages amounting to a large volume of print data in the print data storage device 44 is inconvenient for the entire system 1 because a storage device with an enormous capacity is necessary for the storage device 44. It is not likely that the user will check print documents with such a large number of pages at the printer location. According to this modification, therefore, the process of S30 is modified to check the number of pages of print data created in S10. If the checked number of pages exceeds a prescribed number, then the CPU 21 determines that the print data is not intended for reprinting ("no" in S30). To make the configuration even more convenient for the user, the user can be allowed to set this prescribed number of pages, and the setting can be stored on the hard disk drive 24 or the like.

[Second Embodiment]

A printing system 1 according to a second embodiment of the present invention will be described below with reference to FIG. 9.

The printing system 1 according to the second embodiment is the same as that of the first embodiment except for a point described below.

In the first embodiment, there are no particular restrictions placed on the capacity of the print data storage device 44. The print data storage device 44 is capable of storing print data corresponding to the maximum (n) number of jobs that can be entered in the computer job management table T1 regardless of the amounts of the print data. However, the second embodiment is related to the case where the capacity of the print data storage device 44 is restricted. When the amount of print data, corresponding to the maximum (n) number of jobs recorded in the computer job management table T1, is not large, print data for all the entered jobs can be stored in the print data storage device 44. However, when the amount of print data corresponding to some of the jobs is large, it is anticipated that it will not be possible to store print data corresponding to all the entered jobs in the print data storage device 44, but that print data for some jobs recorded in the table T1 is not stored in the print data storage device 44. In this case, each job in the table T1 is added with information on whether or not the corresponding print data is stored in the storage device 44.

Figure 9:
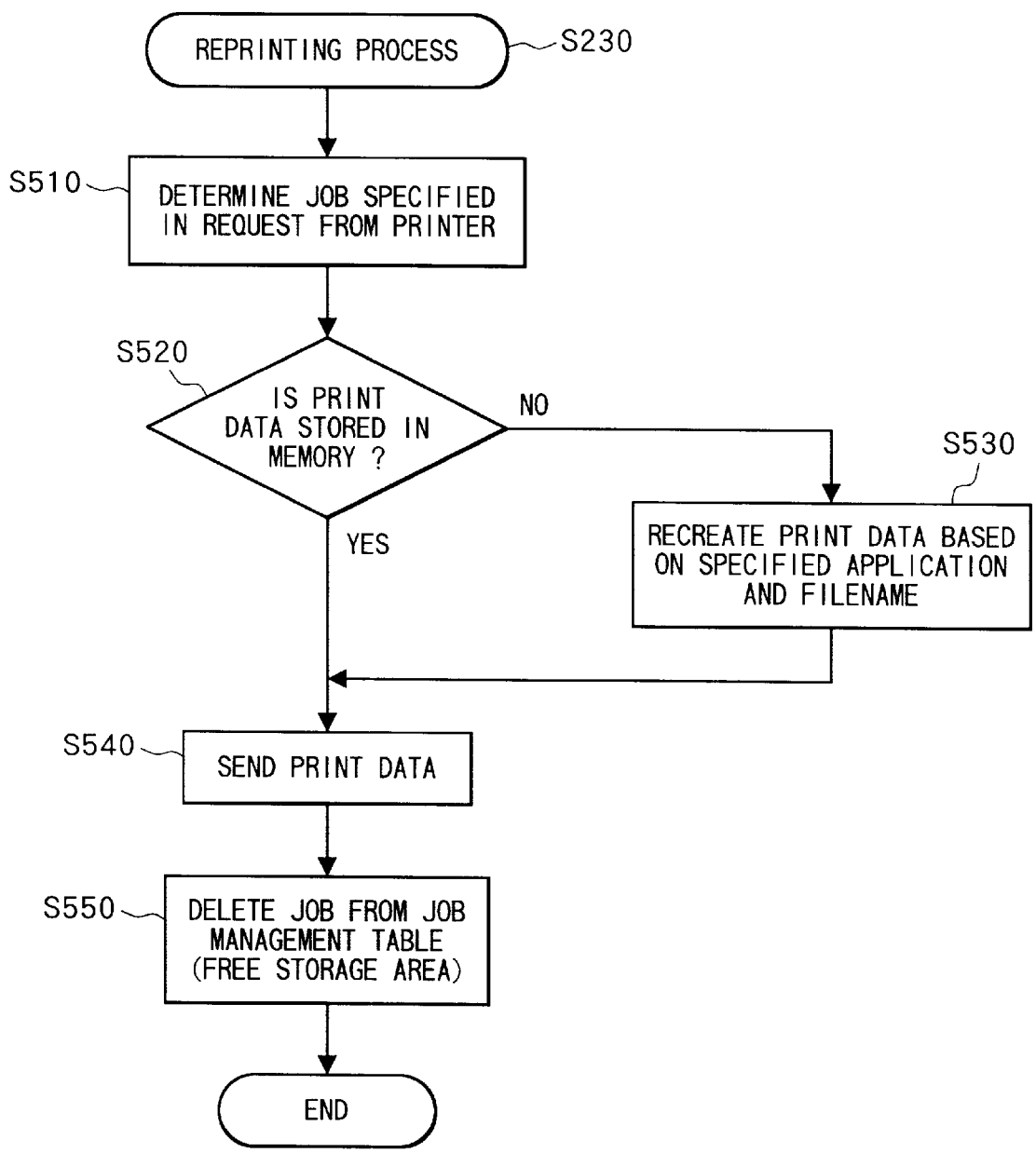
FIG. 9 is a flowchart explaining the reprinting process on the computer end according to a second embodiment of the present invention.

With this arrangement, according to the second embodiment, the computer 20 performs the reprint process of S230 (FIG. 5) of FIG. 9 in place of the reprint process of FIG. 6.

That is, when the computer 20 receives in S220 (FIG. 5) a retransmission request for print data from the printer 10, the CPU 21 in the computer 20 executes the reprint process of FIG. 9. The CPU 21 first specifies in S510 a job corresponding to the print data that is designated by the user at the printer 10 side. Referring to entry data in the computer job management table T1, the computer 20 determines in S520 whether the corresponding print data is stored in the print data storage device 44. If it is determined that the print data is stored in the print data storage device 44 ("yes" in S520), the print data is read and transmitted to the printer 10 in S540 in the same manner as in S120 of the first embodiment. On the other hand, if it is determined that the print data is not stored in the print data storage device 44 ("no" in S520), the CPU 21 searches the table T1, and determines the file name of the print data and the application program used to create that file. Then, the CPU 21 recreates in S530 the print data using the application program and a file with the determined file name that retains information required to prepare the print data. The CPU 21 then sends this print data to the printer 10 in S540.

After sending the print data in S540, the CPU 21 deletes in S550 the job (entry data) related to the print data just retransmitted from the computer job management table T1. In the case where the print data has been stored in the print data storage device 44, the CPU 11 also clears the data storage area for the print data of the storage device 44. On the other hand, if the print data has not been stored in the print data storage device 44, the CPU 11 simply deletes the job (entry data) corresponding to the print data from the computer job management table T1.

It is noted that in the same manner as in S130 of the first embodiment, it is unnecessary to perform the delete process of S550 to delete the job corresponding to the reprinted print data from the printer job management table T1 immediately after the retransmission process of S540. That is, the process of S550 may be omitted. In this modification, if the retransmitted print data is recreated in S530 using the application and if there is storage space remaining in the print data storage device 44, the computer 20 may store the recreated print data in the print data storage device 44 in S530, before transmitting the print data to the printer 10 in S540.

[Third Embodiment]

A printing system 1 according to a third embodiment of the present invention will be described with reference to FIG. 10.

The printing system 1 according to the third embodiment is the same as that of the first embodiment except for a point described below.

In the first embodiment, jobs are deleted in S130 and S470 immediately after the corresponding print data has been reprinted. The oldest job is deleted in S50 and S350 when the table becomes full. Jobs can also be automatically deleted a prescribed time after the jobs are recorded in the computer job management table T1. The present embodiment provides another example for automatically deleting jobs a prescribed time after recording the jobs in the table T1. According to this embodiment, it is possible to omit the processes of S130 and S470.

According to the present embodiment, with using data on the delete time stored in the table T1, jobs and corresponding print data are automatically deleted after the delete time specified by the delete time data has elapsed. More specifically, the computer 20 issues a job delete command when the delete time included in the job data for a certain Job ID has arrived. Receiving the job delete command (yes in S310 and Yes in S320), the printer 10 will perform the maintenance operation in S350 to delete the job specified by the job delete command and to send a delete confirmation to the computer 20.

Figure 10:
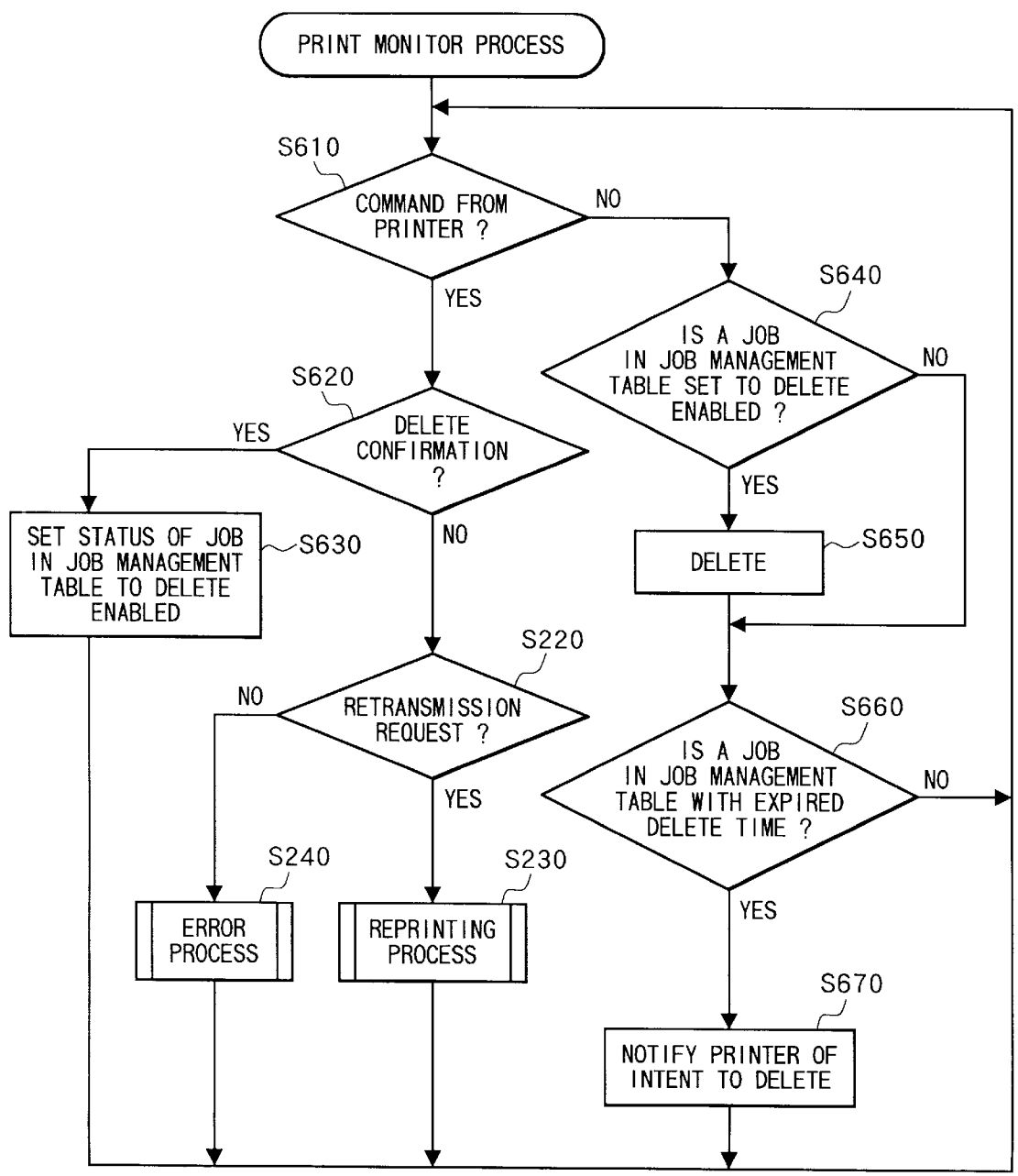
FIG. 10 is a flowchart explaining the process of the print monitor in the computer according to a third embodiment of the present invention.

With the above-described arrangement, according to the present embodiment, the computer 20 performs the print monitor process of FIG. 10 in place of the print monitor process of FIG. 5.

As shown in FIG. 10, the CPU 21 in the computer 20 constantly monitors the printer 10 in S610 to judge whether or not a command has been sent from the printer 10. If it is determined that a command has been sent from the printer 10 ("yes" in S610), the CPU 21 further judges in S620 whether or not this command is a delete confirmation. If it is determined that the received command is a delete confirmation ("yes" in S620), then the CPU 21 sets the corresponding job, in the computer job management table T1 to a delete enabled mode "Delete Enabled" in S630 in order that the next determination in S640 will become affirmative.

On the other hand, if the command is not a delete confirmation ("no" in S620), the process continues in the same manner as described in the first embodiment. That is, in S220, the CPU 21 judges whether the command is a retransmission request. Then, the CPU 21 performs the processes of S230 or S240 in the same manner as in the first embodiment.

On the other hand, if no command has been received from the printer 10 ("no" in S610), the CPU 21 refers to the computer job management table T1 in S640 to determine whether or not there exists any job that has been set to the mode "Delete Enabled". If it is determined that a job has been set to Delete Enabled ("yes" in S640), the corresponding job is deleted in S650.

On the other hand, if it is determined that no job has been set to Delete Enabled ("no" in S640), the CPU 21 further refers to the computer job management table T1 in S660 to determine whether or not there exists any job that has an expired delete time. If a job exists in the table T1 having an expired delete time ("yes" in S660), the CPU 21 sends a job delete command to the printer 10 in S670, and the computer 20 waits for a response (delete confirmation) from the printer 10. That is, upon receiving the job delete command (yes in S320), the printer 10 deletes the corresponding job from the printer job management table T2 and sends a delete confirmation to the computer 20 in S350.

In the above description, a job is deleted from the computer job management table T1 in synchronization with the printer 10 when the delete time set by the user has expired. However, instead of waiting for the specified delete time to expire, the computer 20 can be configured to send to the printer 10 a request for deleting the oldest job from the printer job management table T2 when there remains little free storage space in the print data storage device 44 if the capacity of the storage device 44 is restricted as in the second embodiment. After waiting for a response (delete confirmation) from the printer 10, the computer 20 deletes the relevant job from the computer job management table T1 in order to free up storage area of the storage device 44.

According to the present embodiment, it may be possible to perform a forced delete process without waiting for the printer 10 to respond to the job delete command.

As described above, according to the above-described embodiments, the CPU 11 of the printer 10 performs a retransmission request operation in S450 and S460, a reprint control operation in S430–S460, a remaining data judging operation in S430, and a selection operation in S410 and S420. The CPU 21 of the computer 20 performs a retransmission execution operation in S110 and S120, and a data erasing operation in S610–S670.

As described above, according to the print system of the embodiments and modifications, the computer 20 transmits print data via the interface 29 to the printer 10. The printer 10 receives the print data via the interface 19 and temporarily stores the print data in the RAM 13. The printer 10 then controls the print mechanism 16 to perform print process with using the print data. The printer 10 can request retransmission of the print data, desired to be reprinted, after printing the print data. The monitor 43 in the computer 20 continuously monitors the retransmission request from the printer. The computer 20 retransmits the requested print data to the printer 10 in response to the retransmission request.

This structure is especially suitable when the single printer 10 is remotely connected to the plurality of computers 20 via the local area network 60. A user manipulates his/her own computer 20 to produce print data and to transmit the print data to the printer 10 so that the printer 10 prints the print data. Thereafter, the user approaches the printer 10, and receives print output of the print data from the printer 10. If the user confirms the print output and decides that the print data should be reprinted, the user may manipulate the printer 10 to simply request retransmission of his/her desired print data. As a result, the user does not have to go back to his/her computer 20 to input any reprint command thereto. Because the monitor 43 at the computer 20 continuously checks requests from the printer 10, the computer 20 can immediately retransmit the requested data to the printer 10, thereby efficiently attaining reprinting process.

Especially according to the second embodiment, the computer 20 again produces the print data in response to the retransmission request and transmits the produced print data to the printer. More specifically, in response to the retransmission request from the printer 10, the computer 20 determines an application program that has produced the requested print data, and a file retaining data for creating the print data. The computer 20 executes the application program to retrieve data out of the file and to produce the requested print data. The computer 20 then retransmits the produced print data. Thus, the user can remotely control the computer 20, from the printer 10 side, to perform the same operation with that attained when the user directly operates the computer 20 to perform the reprint operation. The user does not have to move back to the computer. Work efficiency is greatly enhanced.

The computer 20 is provided with the print data memory device 44 for storing print data to be transmitted to the printer 10. The computer 20 can therefore retransmit the print data stored in the print data memory device 44. With this structure, a plurality of sets of print data, which are successively transmitted to the printer 10, are successively stored in the print data memory device 44. When a retransmission request is transmitted from the printer 10, the computer 20 can directly retrieve the requested print data from the memory device 44 and transmit the retrieved data to the printer 10. In this case, it becomes unnecessary to produce the print data through executing the application program. The reprint process will be executed in a short period of time.

Especially, the computer 20 is provided with the computer Job management table T1 for managing a record of each print data which has been transmitted to the printer. More specifically, information on the plurality of sets of print data, which have been successively transmitted to the printer 10, is recorded in order. Each print data is added with identification data ID for identifying the print data. While referring to this computer job management table T1, the computer 20 can immediately designate a set of print data to be retransmitted, among the plurality of sets of print data in the memory device 44.

As described in the first embodiment, the computer 20 may be designed to erase print data from the print data memory device 44 in an order beginning from the oldest-transmitted print data when the print data memory device 44 becomes full of print data. This arrangement is provided considering the capacity of the memory device 44. Generally, print data requested to be reprinted is a set of recently-printed print data among the already-printed plurality of sets of print data. There is a less possibility that older-printed data be requested. Accordingly, the already-printed plurality of sets of print data are successively erased in the order beginning from the oldest printed data.

Especially according to the second embodiment, the computer 20 judges whether or not the requested print data is stored in the print data memory device 44 while referring to the computer job management table T1. When the requested print data is not stored in the print data memory device 44, the computer 20 again produces the print data in response to the retransmission request and retransmits the produced print data to the printer. When the print data is stored in the print data memory device 44, on the other hand, the computer 20 simply retrieves the print data from the print data memory device 44 and transmits the retrieved print data to the printer 10. This structure is especially effective when old print data, which is erased from the memory device 44 through writing newly-printed print data thereover, is requested to be retransmitted. In this case, the application program is again executed to produce the print data and to transmit the print data to the printer 10. On the other hand, when newly-printed print data is requested, the print data is directly retrieved from the memory device 44 and then is transmitted to the printer 10. It is therefore possible to flexibly cope with the retransmission request regardless of whether the requested print data has been printed at old time or not.

The printer 10 is designed to enable a user to select print data requested for retransmission. More specifically, the printer 10 is provided with the liquid crystal display (LCD) 18 on the printer panel. The LCD 18 displays one or more selectable sets of print data, thereby enabling the user to select one set of print data desired to be retransmitted. With this structure, the user can easily designate his/her desired print data when inputting his/her retransmission request command at the printer. Upon receiving the request command, the computer 20 designates the requested print data while referring to the computer job management table T1.

As described in the first embodiment, the printer 10 can be designed to enable a user to select one set of print data to be retransmitted through simply designating an order of use in which printing for the print data has been performed among the plurality of sets of print data. For example, the latest-printed print data set is allocated to a reference order number of zero (0). A print data set which has been printed immediately before the latest-printed print data is allocated to another order number of (−1). Another print data set which has been printed immediately before the (−1)-numbered print data is allocated to still another order number of (−2). The plurality of sets of print data are thus allocated to the order numbers in this order. With this structure, the user can easily and immediately designate one print data set which has been printed recently through designating the order number.

The printer 10 is further provided with the printer job management table T2 for managing a record of print data which has been printed at the printer. The print job management table T2 records, for each set of print data, a file name, the number of pages represented by the print data, information on the originating computer that has sent the print data to the printer 10, and the like. With this structure, it is possible to manage the plurality of sets of print data in order and in a manner that a user can easily understand. In order to input a retransmission request command, the user can easily designate his/her desired print data. The printer job management table T2 is rewritable in correspondence with the computer job management table T1. With this structure, the printer 10 can select the user's designated print data while referring to the printer job management table T2.

As in the first embodiment, when the printer 10 is provided with the memory capable of storing at least one page's worth of print data, for a predetermined type of sheet, transmitted from the computer, the printer 10 first judges whether or not the print data requested to be retransmitted remains in the memory. The printer 10 retrieves the requested print data from the memory and prints the print data when it is judged that the requested data exists in the memory. The printer 10 requests retransmission of the requested print data to the computer 20 when the print data does not remain in the memory.

This arrangement is applied to the printer of the type that can retain in its memory at least one page of print data printed during at least the latest-performed printing operation. This type of printer can reprint the print data retained in the memory. When the user's requested print data corresponds to the last-printed one page of print data, for example, the printer can reprint the user's requested print data by itself. In this case, the printer determines that it can reprint the user's requested data by itself, and prints the print data stored therein. When the printer does not determine that the printer can reprint the user's requested data by itself, on the other hand, the printer transmits a retransmission request command to the computer while referring to the management table T2 provided to the printer. Thus, when the printer can perform its reprint operation all by itself, the printer performs its reprint operation all by itself, thereby enhancing work efficiency.

While the invention has been described in detail with reference to specific embodiments thereof, it would be apparent to those skilled in the art that many modifications and variations may be made therein without departing from the spirit of the invention, the scope of which is defined by the attached claims.

For example, in the first embodiment, data of the application name may not be recorded in the computer job management table T1.

In the embodiments described above, descriptions are given for the case of a plurality of computers 20 supported by one printer 10. However, the present invention can apply to a system having a plurality of printers 10. Further, the present invention can be used for a printer and a computer not configured in a LAN or other network structures.

What is claimed is:

1. A print system for performing a printing operation, the print system comprising:
   a printer including:
      reception means for receiving print data;
      print performing means for performing print process with using the print data; and
      print data retransmission request means for requesting retransmission, of the print data desired to be reprinted after the print performing means has printed the print data; and
   the computer including:
      transmission means for transmitting the print data to the printer so that the printer will print the print data; and
      monitoring means for continuously monitoring the retransmission request from the printer; and
      retransmission execution means for retransmitting the print data to the printer in response to the retransmission request.

2. A print system as claimed in claim 1, wherein the retransmission execution means includes print data production means for producing the print data in response to the retransmission request and for transmitting the produced print data to the printer.

3. A print system as claimed in claim 1, wherein the computer is provided with a print data memory device for storing print data to be transmitted to the printer, the retransmission execution means retransmitting the print data stored in the print data memory device.

4. A print system as claimed in claim 1, wherein the computer includes a computer job management table for managing a record of print data which has been transmitted to the printer, the retransmission execution means including designation means for designating print data, to be retransmitted, with referring to the computer job management table.

5. A print system as claimed in claim 3, wherein the computer further includes data erasing means for erasing print data from the print data memory device in an order beginning from the oldest-transmitted print data when the print data memory device becomes full of print data.

6. A print system as claimed in claim 5,
   wherein the computer further includes a computer job management table for managing a record of each print data which has been transmitted to the printer, and
   wherein the retransmission execution means includes:
      judging means for judging whether or not the requested print data is stored in the print data memory device while referring to the computer job management table;
      print data producing means for producing the print data in response to the retransmission request and for transmitting the produced print data to the printer when the requested print data is not stored in the print data memory device; and
      print data retrieving means for retrieving the print data from the print data memory device and for transmitting the retrieved print data to the printer when the print data is stored in the print data memory device.

7. A print system as claimed in claim 6, wherein the printer further includes selection means for selecting print data to be requested to the computer for retransmission, the retransmission execution means including designation means for designating the requested print data with referring to the computer job management table.

8. A print system as claimed in claim 7, wherein the selection means selects one set of print data to be retransmitted through designating an order in which the print performing means has performed printing process with the one set of print data among a plurality of sets of print data.

9. A print system as claimed in claim 7, wherein the printer includes a printer job management table for managing a record of print data which has been printed at the printer, the selection means selecting print data to be retransmitted with reference to the printer job management table, the printer job management table being rewritable in correspondence with the computer job management table.

10. A print system as claimed in claim 1, wherein the printer includes:
   a memory capable of storing at least one page's worth of print data for a predetermined sheet transmitted from the computer;
   remaining data judging means for judging whether the print data requested to be retransmitted remains in the memory; and
   reprint control means for retrieving the requested print data from the memory and for controlling the print performing means to print the print data when the remaining data judging means judges that the requested data exists in the memory and for controlling the retransmission request means to request retransmission of the requested print data when the print data does not remain in the memory.

11. A printer for performing printing process based on print data transmitted from a computer, the printer comprising:
   receiving means for receiving print data from a computer;
   print process means for printing the print data; and
   retransmission request means for requesting the computer to retransmit print data after the print data has been printed.

12. A printer as claimed in claim 11, further comprising selection means for selecting print data to be requested to a computer for retransmission.

13. A printer as claimed in claim 12, wherein the selection means selects one set of print data to be retransmitted through designating an order in which the print process means has printed the one set of print data among a plurality of sets of print data.

14. A printer as claimed in claim 12, further comprising a printer job management table for managing a record of print data which has been printed at the printer, the selection means selecting print data to be retransmitted with reference to the printer job management table.

15. A printer as claimed in claim 11, further comprising:
   a memory capable of storing at least one page's worth of print data for a predetermined sheet transmitted from the computer;
   remaining data judging means for judging whether the print data requested to be retransmitted remains in the memory; and
   reprint control means for retrieving the requested print data from the memory and for controlling the print process means to print the print data when the remaining data judging means judges that the requested data exists in the memory and for controlling the retransmission request means to request retransmission of the requested print data when the print data does not remain in the memory.

16. The print system according to claim 1, wherein the printer further comprises:
   input means for enabling a user to input a reprint command to reprint the print data, the print data retransmission request means requesting the computer to retransmit the print data in response to the inputted reprint command.

17. The printer according to claim 11, further comprising:
   input means for enabling a user to input a reprint command to reprint the print data, the retransmission request means requesting the computer to retransmit the print data in response to the inputted reprint command.

* * * * *